A. B. BROTHERS.
TURN TABLE FOR AUTOMOBILES.
APPLICATION FILED NOV. 23, 1917.

1,257,456.

Patented Feb. 26, 1918.
2 SHEETS—SHEET 1.

INVENTOR
Arthur B. Brothers,

WITNESSES
James F. Crown,
W. B. Vrooman,

By Richard B. Owen,
ATTORNEY

A. B. BROTHERS.
TURN TABLE FOR AUTOMOBILES.
APPLICATION FILED NOV. 23, 1917.
1,257,456.
Patented Feb. 26, 1918.
2 SHEETS—SHEET 2.
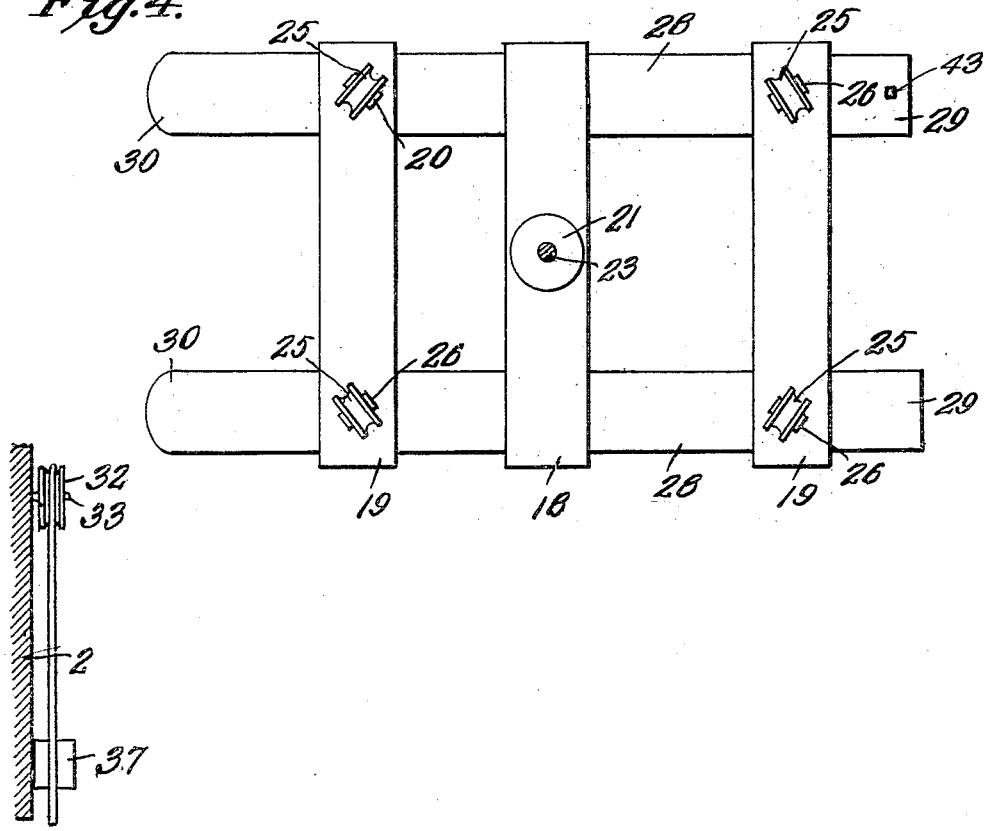
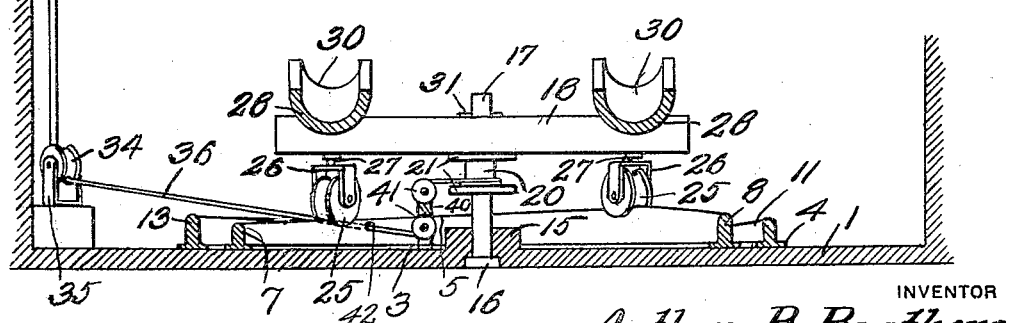
INVENTOR
Arthur B. Brothers,
WITNESSES
James F. Crown,
H. P. Vrooman.
By Richard B. Owen,
ATTORNEY

UNITED STATES PATENT OFFICE.

ARTHUR B. BROTHERS, OF WINFIELD, KANSAS.

TURN-TABLE FOR AUTOMOBILES.

1,257,456.

Specification of Letters Patent.

Patented Feb. 26, 1918.

Application filed November 23, 1917. Serial No. 203,595.

*To all whom it may concern:*

Be it known that I, ARTHUR B. BROTHERS, a citizen of the United States, residing at Winfield, in the county of Cowley and State of Kansas, have invented certain new and useful Improvements in Turn-Tables for Automobiles, of which the following is a specification.

This is a turntable and has special reference to garage turntables.

One object of this invention is the production of a turntable which because of its simple construction may be placed within a garage so as to permit an automobile to be driven thereon and at the same time the turntable will revolve approximately one half of a revolution for allowing the automobile to pass forwardly out of the garage.

Another object of this invention is the production of a garage turntable wherein the tracks upon which the carriage is mounted have diametrically opposed high and low points, thus causing the carriage to move by gravity for one-half a revolution and to be released, thus permitting the automobile carried thereon to pass forwardly out of the garage.

Another object of this invention is the production of a garage turntable wherein simple and efficient means is provided for automatically returning the carriage to its normal position after the automobile has passed therefrom.

A still further object of this invention is the production of a garage turntable wherein a drum is mounted upon the carriage and has a cable secured thereto, this cable also being connected to a weight, thus when the weight of the automobile upon the turntable rotates, the carriage to permit the automobile to pass therefrom in a forward direction, the turntable upon being freed will be returned to its elevated position by action of the weight upon the cable.

With these and other objects in view, this invention consists of such novel combinations, constructions, and arrangement of parts as will be hereinafter fully described and claimed.

One practical form of construction and assembly of the present invention will be described and illustrated in the accompanying drawing, in which—

Fig. 3 is a transverse section taken on the line 3—3 of Fig. 1, looking in the direction of the arrows, and Fig. 4 is a bottom plan view of the carriage.

Referring to the accompanying drawing by numerals, it will be seen that this turntable is adapted to be used particularly in a garage having the usual floor 1 and wall 2. It is of course obvious that this turntable may be used in any place desired for turning the vehicles of various natures without departing from the spirit of the present invention.

Figure 1:
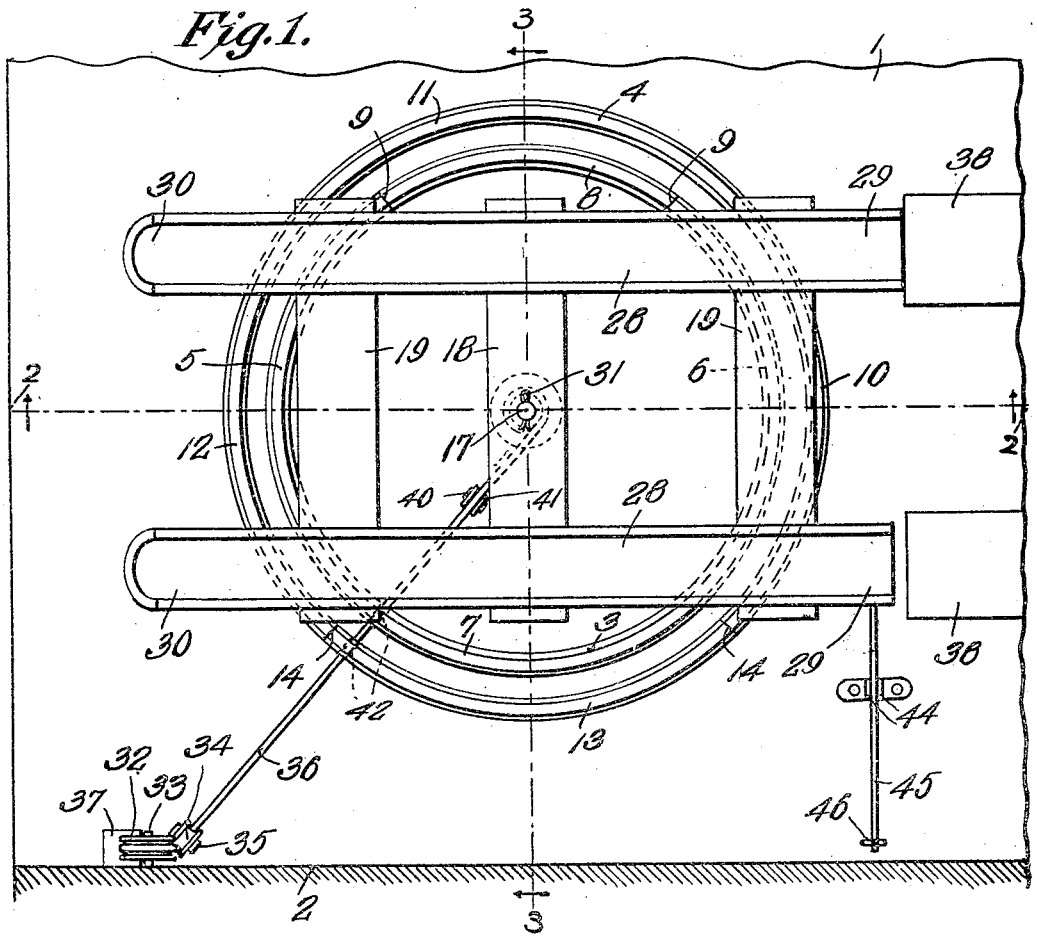
Figure 1 is a top plan view of the garage turntable

The tracks of this turntable comprise an inner track 3 and an outer track 4, as illustrated clearly in Fig. 1. The inner track 3 is provided with a higher side 4 which gradually slants downwardly to its low side 6. From the low side 6 to the higher side 5 the grade is gradual between these points as at the portion of the track indicated at 7. On the opposite side of the track however, there is provided a non-used tread 8 between the points indicated at 9. If so desired this tread 8 may be removed and not used thus causing the track to be provided with interrupted treads, although if so desired the track may be rolled as a single piece for strengthening the same when in use. It will be noted, by referring to Fig. 2 that the non-used tread portion 8 of the inner track slopes upwardly from the low side 6 of the track to the high side 5 thereof.

The outer track 4 is provided with a high side 10 and the tread gradually inclines downwardly around the portion 10 to the low side 12 of this outer track. This outer track is also shown as having the non-used tread 13 which extends from the low side 12 of the outer track to the high side and this non-used tread is between the points 14 of the outer track and may be omitted in the construction of the outer track if so desired. It is shown herein, however, and extends upwardly from the low side 12 of the outer track, as shown in Figs. 1 and 3 to be contiguous with the high side of the track. In this way the outer track will also be firmly reinforced and will be held from spreading when in use. As above specified however, this non-used tread 13 of the outer track may be omitted if desired.

By referring to the description of the tracks, it will be seen that the high points 10 of the outer track is adjacent the low side 6 of the inner track, while the high side 5 of the inner track is adjacent the lower side 12 of the outer track, thus causing the high sides of the track to be opposite as well as the low sides thereof to be opposite for causing one high side and one low side of the tracks to be adjacent each other and thus form a pair of tracks which have a substantially parallel or inclined structure for purposes to be hereinafter set forth.

Figure 2:
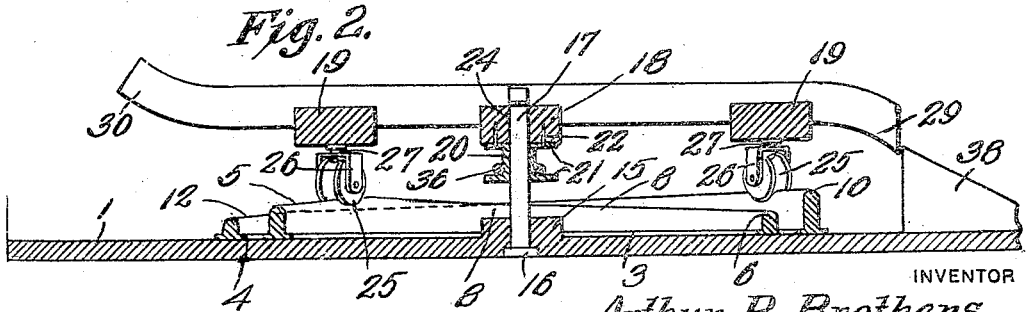
Fig. 2 is a longitudinal section taken on the line 2—2 of Fig. 1, looking in the direction of the arrows

The floor 1 of the garage or other supporting structure may be provided with a thickened portion 15 in which the head 16 of the pivot shaft 17 is admitted as shown clearly in Figs. 2 and 3. This shaft 17 extends for a considerable distance above the thickened portion 15 for purposes to be hereinafter set forth.

The carriage comprises the pivot beam 18 and the caster beams 19. These beams are parallel and are spaced apart, as shown clearly in Fig. 4. The drum 20 is provided with parallel flanges 21 and this drum 20 is secured by the element 22 to the pivot beam 18, adjacent the center thereof. This drum 20 is provided with a central opening 23 and registers with the opening 24 formed in the beam 18. Grooved casters 25 are supported upon the pivotally mounted brackets 26 secured as indicated at 27 to the caster beams 19 adjacent the ends of the carriage. The elongated tracks 28, which are U shaped in cross section are secured in any suitable manner upon the beams 18 and 19, thus forming a very rigid and substantially one-piece carriage which will operate as a unit. It should be noted, by referring particularly to Fig. 2 that the rear ends of the tracks 28 slope downwardly as indicated at 29 while the forward ends slant upwardly as shown at 30.

The carriage is positioned so as to allow the shaft 17 to extend through the opening 23 formed in the drum 20 and through the opening 24 formed in the pivot beam 18. A cotter pin 31 is passed through the shaft 17 adjacent the upper end thereof for preventing the accidental displacement of the carriage or the lifting of the casters from engagement with the track. It is of course obvious that the casters carried on the caster beam adjacent the rear end of the carriage will fit upon the outer track as shown in Fig. 2, while the casters upon the caster beam carried adjacent the forward end of the carriage will ride upon the inner track 3 as shown in Fig. 3.

A pulley 32 may be supported by a pin 33 carried by wall 2 while the pulley 34 may be suitably supported as indicated at 35 adjacent the floor or base 1 of the garage.

The cable 36 is secured to the drum 20 as shown in Figs. 1 to 3 inclusive and then this cable passes around the pulley 34 and over the pulley 32 to have the weight 37 secured thereto.

In order to allow the cable 36 to clear the tracks, or permit the casters to move upon the track without interference from the cable, a standard 40 is carried adjacent the thickened portions 15, as illustrated in Fig. 3 and the idlers 41 are carried upon this standard 40 in spaced relation. It will be noted that the cable passes from the drum 20 and over the upper idler and then around the lower idler so as to be passed downwardly adjacent the floor or base 1. The rails are also provided with registering openings 42 through which the cable extends and the cable then projects to carry the weight 37 in the manner hereinbefore specified. It is of course obvious that if so desired, the cable may be carried far enough to pass under the rails instead of therethrough as illustrated, thus permitting the cable to be wound upon the drum or to be unreeled therefrom without interfering with the movement of the casters upon the tracks.

It will also be noted that the beveled block 38 may be carried upon the support or base 1 of the garage at a point adjacent the end of the carriage as shown in Fig. 2. In order to releasably retain the carriage in an adjusted set position while the automobile is being driven thereonto, a lug 43 is carried upon one of the tracks 28, as shown in Fig. 4. Brackets 44 are carried by the support 1 at a point adjacent one of the blocks 38, as illustrated in Fig. 1, while the latch lever 45 is pivotally mounted upon the bracket. This latch lever may be provided with a connection 46 for swinging the same, and this connection may constitute a rope or other element extending to a point adjacent the carriage, thus allowing the chauffeur of the machine driven onto the carriage to grip the element 46 for swinging this latch lever 45. It should be noted however, by referring particularly to Fig. 1, that the latch lever is eccentrically mounted upon the brackets 44 and for this reason the inner end adjacent the carriage is normally urged upwardly by the off-center support of the latch lever. For this reason the latch lever will engage the lug 43 and will normally retain the carriage in a set position when the automobile is being driven thereonto. When however, the element 46 is gripped and the outer end of the latch lever is swung outwardly, it is obvious the inner end of this lever will be swung from engagement with the lug 43 and for this reason will permit the carriage to be released to move around in the manner hereinbefore specified.

When this turntable is in use, it will first assume the position indicated in Figs. 1 and 2. The downwardly extending ends of the tracks will then be at points adjacent the lock 38. The automobile may then be driven up the spaced bolts onto the tracks 28 and owing to the U-shaped construction of these tracks, it is obvious the automobile will be held against accidental side displacement or running over the side edges of the track, while owing to the upturned ends 30 of the tracks 28, the forward movement of the automobile will be limited to a certain extent so as to allow the chauffeur to quickly cut off the power and apply the brakes for holding the machine against further movement, on the tracks 28. At this time the turntable may be released from its set position and as the casters 25 will be upon the high sides 5 and 10 of the inner and outer tracks respectively, by force of gravity these casters will move around down the slanting track and in this way the turntable will be automatically revolved for approximately one-half of a revolution. As soon as the casters reach the low sides 6 and 12 of the inner and outer tracks respectively, it is obvious further movement of the carriage will cease and thus the upturned end 30 will be in direct alinement with the blocks 38. It will also be seen that these upturned ends will be adjacent these blocks, inasmuch as when the wheels are moving to the lowered portions of the inner and outer tracks, the carriage will move downwardly as it will slide along the shaft 17 although pivoting therearound. Although the carriage will move downwardly as it rotates, owing to the inclined construction of the tracks, it is of course obvious the carriage will be maintained in a level position owing to the fact that the brackets of the casters are of proper length, to hold the carriage against tilting at any time. It will be noted that as the carriage rotates for turning the automobile, the cables 36 will be reeled upon the drum 20. This action of the cable will cause the weight 37 to be elevated so that when the automobile has moved from the turntable, the turntable will be freed and owing to the fact that it is intended to have the weights of such size as to overcome the resistance of the turntable, the weight will pull upon the cable 36 so as to turn the drum 20 and thus swing the turntable to its normal position. The turntable will assume its normal position by the casters 25 riding upwardly along the inclined tracks until receiving a position upon the high points of these inner and outer tracks.

From the description of the foregoing invention, it will be seen that the carriage of the turntable is normally in a position to permit an automobile to be driven thereon. As soon as the carriage has been released the carriage will automatically turn by the force of gravity causing the wheels to move downwardly to the lower portions of the track until the upwardly extending ends 30 of the track 28 are in alinement with the blocks 38, thus permitting the automobile to be driven from the turntable in a forward direction, for easily passing out of the garage. After the weight of the automobile has been removed from the carriage, the coiled cable upon the drum actuated by the weight 37 will again return the turntable to its normal position for receiving another automobile prior to turning the same to move from the turntable.

It is obvious that many detail changes may be made in the construction of this invention without departing from the spirit of the device, such for instance as in the specification wherein the track is shown to be of practical construction whether circular or interrupted in respect to its tread, and for this reason it is not desired to limit the construction of the invention to the specific form herein shown as it is intended to include all such forms of the invention as properly come within the scope of the device, as claimed.

What is claimed is:—

1. In a device of the class described, the combination of a pair of substantially circular tracks having high points and low points, a carriage comprising beams having parallel tracks held thereon, casters connected to said beams and riding upon said tracks, a pivot shaft projecting through one of said beams, said carriage being pivotally mounted upon said beam and being adapted to move vertically thereof, guide blocks carried adjacent said tracks, said tracks having downwardly curved rear ends and upwardly curved forward ends, whereby an automobile may be easily driven onto said tracks, said carriage being adapted to turn approximately one-half of a revolution when an automobile is driven thereonto by movement of said casters from the high point of said tracks to the low points thereof, at which time the upturned ends of said tracks will be adjacent the blocks for permitting the automobile to be moved forwardly from said carriage.

2. In a device of the class described, the combination of a plurality of substantially circular tracks having high points and low points, a pivot shaft held between said tracks, a carriage comprising beams having tracks thereon, said tracks having downwardly curved lower ends and upwardly curved forward ends, casters carried upon said beams and riding upon said tracks, guide blocks carried adjacent the down curved ends of said tracks, thus allowing an automobile to be driven on said tracks and then allowing the carriage to be rotated approximately one-half of a revolution, thus causing the upturned ends to be adjacent said blocks for permitting the automobile to be driven from said carriage, a drum carried by said carriage, a cable connected to said drum, means for drawing upon said cable, whereby when said carriage is rotated the cable will be reeled upon said drum so that when the automobile has been moved from said carriage, said cable will rotate said drum thus swinging said carriage and causing said casters to move from the low points of said tracks to the high points of said tracks for returning said carriage to its normal position.

3. In a device of the class described, the combination of a pair of substantially circular tracks having high and low points, a carriage comprising beams having parallel tracks thereon, casters connected to said beams and riding upon said first mentioned tracks, guide blocks carried adjacent said last-mentioned tracks, said last-mentioned tracks having downwardly curved rear ends, and upwardly curved forward ends, whereby an automobile may be easily driven onto said last-mentioned tracks, said carriage being adapted to turn approximately one-half of a revolution when an automobile is driven thereonto by movement of said casters from the high points of said first-mentioned tracks to the low points thereof at which time the upturned end of said last-mentioned tracks will be adjacent the blocks for permitting the automobile to be moved forwardly from said carriage.

4. In a device of the class described, the combination of a plurality of curved tracks having high and low points, a carriage comprising beams having parallel tracks thereon, said last mentioned tracks having their downwardly curved rear ends and upwardly curved forward ends, casters carried upon said carriage and riding upon said first mentioned tracks, guide blocks carried adjacent the down turned ends of said last mentioned tracks, thus allowing an automobile to be driven onto said last mentioned tracks and then allowing the carriage to be rotated approximately one-half of a revolution, thus causing the upturned ends to be adjacent said blocks for permitting the automobile to be driven from said carriage, a drum carried by said carriage, a cable connected to said drum, means for drawing upon said cable, whereby when said carriage is rotated the cable will be reeled upon said drum so that when the automobile has been moved from said carriage said cable will rotate said drum, thus swinging said carriage and causing said casters to rotate from the low points of said tracks to the high points of said tracks for returning said carriage to its normal position.

5. In a device of the class described, the combination of a carriage, means for pivotally supporting said carriage, said means being adapted to cause the carriage to be moved to a lower plane as the same is rotated, said carriage including tracks mounted thereon, said tracks having downwardly curved rear ends and upwardly curved forward ends, guide blocks carried adjacent said carriage, whereby when said carriage is in a normal position said downturned ends will be adjacent said blocks, thus allowing an automobile to be driven upon said blocks and then onto said tracks, the upturned forward ends of said tracks constituting a means for assisting in limiting the forward movement of the automobile, and said upturned ends being positioned adjacent said blocks after said turntable has swung around, thus allowing the automobile to pass up over the upturned forward ends of the tracks and then downwardly upon said guide blocks.

6. In a device of the class described, the combination of a carriage, means for automatically shifting said carriage for causing the same to rotate for approximately one-half of a revolution after weight has been applied thereon, a lug carried upon said carriage, brackets carried adjacent said carriage, a latch pivotally mounted upon said bracket and releasably engaging said lug, a connection carried by said latch, whereby after weight has been applied on said carriage said connection may pull said latch for causing said latch to disengage said lug, thus permitting said carriage to move.

7. In a device of the class described, the combination of a carriage, means for pivotally supporting said carriage, said means being adapted to cause the carriage to be moved to a lower plane as the same is rotated, said carriage including tracks mounted thereon having downwardly curved rear ends and upwardly curved forward ends, whereby when the carriage is in a normal position, the downward ends will facilitate the driving of an automobile onto said tracks, the upturned forward ends of said tracks constituting a means for assisting in limiting the forward movement of the automobile, and said upturned ends being adapted to extend to a point adjacent the support for permitting the automobile to be driven from the carriage when desired.

8. In a device of the class described, the combination of a carriage, means for pivotally supporting said carriage, said means being adapted to cause the carriage to be moved to a lower plane as the same is rotated, said carriage including tracks mounted thereon having upwardly curved forward ends, the rear ends of said tracks being adapted to be positioned adjacent a support for permitting the automobile to be driven onto said tracks, said upturned forward ends of said tracks constituting a means for assisting in limiting the forward movement of the automobile, and said upturned ends being positioned adjacent a support, and after the turntable has swung around, thus allowing the automobile to pass up over the upturned forward ends of the track to be moved from the carriage.

9. In a device of the class described, the combination of a carriage, means for pivotally supporting said carriage, said means being adapted to cause the carriage to be moved to a lower plane when the same is rotated, said carriage including tracks thereon, the rear ends of said tracks being adapted to be normally positioned near a support for permitting an automobile to be driven onto the tracks, means at the forward ends of the tracks to assist in limiting the forward movement of the automobile, and said last mentioned means being adapted to be positioned adjacent the support after the carriage has swung around, thus allowing the automobile to pass over the last mentioned means onto the support.

In testimony whereof I affix my signature in presence of two witnesses.

ARTHUR B. BROTHERS.

Witnesses:
SADIE HUSTON,
JAMES LORTON.

Copies of this patent may be obtained for five cents each, by addressing the "Commissioner of Patents, Washington, D. C."